United States Patent [19]

Seppänen et al.

[11] Patent Number: 5,674,797
[45] Date of Patent: Oct. 7, 1997

[54] METHOD FOR REGENERATING A HYDROGENATION CATALYST

[75] Inventors: Reijo Seppänen, Äetsä ; Vesa Jokinen, Voikkaa, both of Finland

[73] Assignee: Finnish Chemicals Oy, Aetsa, Finland

[21] Appl. No.: 392,250

[22] Filed: Feb. 22, 1995

[30] Foreign Application Priority Data

Mar. 4, 1994 [FI] Finland ................................ 941057

[51] Int. Cl.$^6$ ........................ B01J 38/52; B01J 38/50; C01B 15/023
[52] U.S. Cl. ................ 502/33; 502/29; 423/588; 423/589; 423/590
[58] Field of Search .................. 502/29, 33; 423/588, 423/589, 590

[56] References Cited

U.S. PATENT DOCUMENTS

| | | | |
|---|---|---|---|
| 3,887,490 | 6/1975 | Schreyer et al. | 252/414 |
| 3,901,822 | 8/1975 | Browning et al. | 502/26 |
| 4,164,481 | 8/1979 | Ma et al. | 502/25 |
| 4,351,820 | 9/1982 | Thirion | 502/46 |
| 5,435,985 | 7/1995 | Pukkinen et al. | 502/315 |

FOREIGN PATENT DOCUMENTS

| | | |
|---|---|---|
| 1427928 | 4/1966 | France . |
| 2103541 | 4/1972 | France . |
| 1055513 | 4/1959 | Germany . |
| 210917 | 8/1961 | Sweden . |

*Primary Examiner*—Elizabeth D. Wood
*Assistant Examiner*—Alexander G. Gmyka
*Attorney, Agent, or Firm*—Baker & Botts, L.L.P.

[57] ABSTRACT

The invention relates to a method for regenerating a hydrogenation catalyst employed in the production of hydrogen peroxide, being characterized in that the catalyst to be regenerated is treated with an oxidized working solution used in the production of hydrogen peroxide.

4 Claims, No Drawings

METHOD FOR REGENERATING A HYDROGENATION CATALYST

The present invention relates to a method for regenerating a hydrogenation catalyst employed in the production of hydrogen peroxide, being characterized in that the catalyst to be regenerated is treated with an oxidized working solution used in the production of hydrogen peroxide.

The most advantageous methods for producing technical hydrogen peroxide are what are known as oxidation-reduction methods, such as the anthraquinone/ anthrahydroquinone method; instead of anthraquinone, for example an anthraquinone derivative may be used as an intermediate (reaction carrier). These are multi-step processes: anthraquinone is first hydrogenated to anthrahydroquinone in the presence of a catalyst, in the next step anthrahydroquinone is again oxidized to the anthraquinone form with simultaneous formation of hydrogen peroxide, and finally the resulting hydrogen peroxide is extracted with water. The methods normally also comprise regeneration steps for maintaining the working solution operative.

The intermediate, e.g. anthraquinone, employed in processes for the manufacture of hydrogen peroxide is dissolved in a solvent or solvent mixture capable of dissolving both the hydrogenated and the oxidized form of the intermediate and also hydrogen peroxide. Conventional solvents include aromatic, aliphatic alcohols and certain esters. In addition to the intermediate and solvent(s), the working solution also includes decomposition products of quinones. This working solution is recycled in the process through hydrogenation, oxidation, extraction and regeneration steps back to the hydrogenation stage.

Palladium is most often used as the hydrogenation catalyst. Palladium may be in the form of a fine powder, supported upon an inert carrier (fixed bed catalyst) or in the form of a fine suspension catalyst (for example 2% Pd on a carrier). Suspension catalyst in solution is usually provided in an amount of a few grams to a few dozen grams per litre. All catalyst forms share in common a porous structure having a comparatively large specific surface, up to 200 $m^2/g$. The reactive agents migrate into the pores of the catalyst and react therein, and the reaction products then migrate into the solution.

Besides the main reaction, also undesirable side reactions usually take place. Some products of the side reactions are not removed from the pores of the catalyst, but start filling up the pores, thus impairing the activity of the catalyst, i.e. slowing down the reaction rate. In order to maintain the reaction rate, either the reaction conditions have to be altered (temperature raised, etc.), which entails departing from the optimum operative range, or new catalyst has to be added and/or the catalyst must be replaced. When a suspension catalyst is employed, the procedure is normally such that new catalyst is added until a predetermined limit value for suspension density in view of mixing has been reached (e.g. 50 g of catalyst/l), whereafter a quantity of spent catalyst equal to the addition of new catalyst is removed. When a fixed bed catalyst is used, it may be necessary to replace the entire catalyst bed. It is obvious that if deactivation of the catalyst can be prevented or the catalyst regenerated, the costs of the catalyst can be reduced. It has now unexpectedly been found that the hydrogenation catalyst employed in the production of hydrogen peroxide can be regenerated in such a way that the spent catalyst is treated with a working solution that has been subjected to oxidation only during the working solution cycle.

An oxidized working solution refers to a working solution withdrawn from the oxidation step, that is, the solution contains anthraquinone or an anthraquinone derivative in quinone form.

In regeneration, the oxidized working solution may be employed as such in a hydrogenation reactor, or the regeneration may be carried out in a separate secondary flow apparatus. Preferably, the regeneration is carried out by discontinuing the hydrogen feed to the hydrogenation reactor. Preferably, the regeneration time is 3 to 8 hours. The working solution employed in regeneration is recycled back to the hydrogenation step.

The following examples illustrate the novel method for regenerating a hydrogenation catalyst. The values for the degree of hydrogenation reported in the examples indicate the quantity of hydrogen peroxide contained in the working solution. This again directly indicates to what extent hydrogenation has converted quinones to hydroquinones. In the examples, the process conditions were the same subsequent and prior to regeneration of the catalyst, and thus the change in the degree of hydrogenation is indicative of how treatment of the catalyst has added its activity.

EXAMPLE 1

Hydrogenation conditions:

| | |
|---|---|
| Amount of working solution | 30 kg |
| Composition of working solution | |
| tetrahydro quinones (ethyl and amyl) | 171.3 g/l |
| ethyl and amyl quinones | 34.9 g/l |
| Amount of catalyst | 50 g |
| Granule size of catalyst | 50–100 pm |
| Hydrogen feed rate | 500 l/h |
| Temperature | 46° C. |
| Pressure | 300 kPa |
| Degree of hydrogenation | 11.5 g/l |

The catalyst (2% Pd on a carrier) was regenerated by discontinuing the hydrogen feed to the hydrogenation reactor, the solution thus being recycled normally through all process steps. The hydrogenation catalyst was maintained in a suspended state by mixing. The regeneration time was 4 hours. Subsequent to the regeneration, the hydrogenation (hydrogen feed) was restarted. The degree of hydrogenation after regeneration was 13.0 g/l.

EXAMPLE 2

The procedure was similar to that of Example 1, but the regeneration time was 23.5 hours.

The degree of hydrogenation prior to regeneration was 15.0 g/l and after regeneration 17.7 g/l .

EXAMPLE 3

The procedure was similar to that of Example 1, but the regeneration time was 24.6 hours.

The degree of hydrogenation prior to regeneration was 16.1 g/l and after regeneration 16.5 g/l .

EXAMPLE 4

The procedure was similar to that of Example 1, but the regeneration time was 21.8 hours.

The degree of hydrogenation prior to regeneration was 10.3 g/l and after regeneration 14.8 g/l.

EXAMPLE 5

The procedure was similar to that of Example 1, but the regeneration time was 7 hours.

The degree of hydrogenation prior to regeneration was 11.1 g/l and after regeneration 13.2 g/l.

We claim:

1. A method for regenerating a hydrogenation catalyst employed in the production of hydrogen peroxide, characterized in that the catalyst to be regenerated is treated in a hydrogenation reactor with an oxidized working solution used in the production of hydrogen peroxide and further characterized in that the regeneration is carried out by recycling the working solution to the hydrogenation reactor while the hydrogen feed is discontinued.

2. A method as claimed in claim 1, characterized in that the catalyst is palladium.

3. A method as claimed in claim 2, characterized in that the catalyst is palladium supported on a carrier.

4. A method as claimed in claim 1, characterized in that the regeneration time is 3 to 8 hours.

* * * * *